United States Patent
Cheswick

(10) Patent No.: US 8,457,366 B2
(45) Date of Patent: Jun. 4, 2013

(54) SYSTEM AND METHOD FOR MATCHING FACES

(75) Inventor: William Roberts Cheswick, Bernardsville, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1069 days.

(21) Appl. No.: 12/333,839

(22) Filed: Dec. 12, 2008

(65) Prior Publication Data

US 2010/0150407 A1   Jun. 17, 2010

(51) Int. Cl.
*G06K 9/00* (2006.01)

(52) U.S. Cl.
USPC ............................................. 382/118

(58) Field of Classification Search
USPC ............................................. 382/118
See application file for complete search history.

(56) References Cited

U.S. PATENT DOCUMENTS

| | | | |
|---|---|---|---|
| 7,187,787 B2 * | 3/2007 | Milne et al. | 382/118 |
| 7,916,976 B1 * | 3/2011 | Kedikian | 382/305 |
| 8,150,109 B2 * | 4/2012 | Sung et al. | 382/118 |
| 8,189,927 B2 * | 5/2012 | Steinberg et al. | 382/224 |
| 2005/0117783 A1 * | 6/2005 | Sung et al. | 382/118 |
| 2006/0177109 A1 * | 8/2006 | Storch | 382/118 |
| 2007/0172155 A1 * | 7/2007 | Guckenberger | 382/305 |
| 2007/0286463 A1 * | 12/2007 | Ritzau et al. | 382/118 |
| 2007/0291998 A1 * | 12/2007 | Takizawa et al. | 382/118 |
| 2008/0052312 A1 * | 2/2008 | Tang et al. | 707/104.1 |
| 2008/0137918 A1 * | 6/2008 | Eura et al. | 382/118 |
| 2008/0146274 A1 * | 6/2008 | Cho | 455/556.1 |
| 2008/0240702 A1 * | 10/2008 | Wassingbo et al. | 396/310 |
| 2008/0243861 A1 * | 10/2008 | Wassingbo et al. | 707/10 |
| 2009/0034805 A1 * | 2/2009 | Perlmutter et al. | 382/118 |
| 2009/0037477 A1 * | 2/2009 | Choi et al. | 707/104.1 |
| 2009/0060294 A1 * | 3/2009 | Matsubara et al. | 382/118 |
| 2009/0252383 A1 * | 10/2009 | Adam et al. | 382/118 |
| 2009/0304238 A1 * | 12/2009 | Ebata et al. | 382/118 |
| 2009/0324022 A1 * | 12/2009 | Sangberg et al. | 382/118 |
| 2010/0008550 A1 * | 1/2010 | Dinerstein et al. | 382/118 |
| 2010/0119123 A1 * | 5/2010 | Mardell | 382/118 |
| 2010/0135584 A1 * | 6/2010 | Tang et al. | 382/218 |
| 2010/0150407 A1 * | 6/2010 | Cheswick | 382/118 |
| 2010/0310135 A1 * | 12/2010 | Nagaoka et al. | 382/118 |
| 2011/0280447 A1 * | 11/2011 | Conwell | 382/103 |
| 2012/0008837 A1 * | 1/2012 | Goldberg et al. | 382/118 |
| 2012/0114249 A1 * | 5/2012 | Conwell | 382/190 |

* cited by examiner

*Primary Examiner* — Aaron W Carter

(57) ABSTRACT

Disclosed herein are systems, computer-implemented methods, and tangible computer-readable media for matching faces. The method includes receiving an image of a face of a first person from a device of a second person, comparing the image of the face of the first person to a database of known faces in a contacts list of the second person, identifying a group of potential matching faces from the database of known faces, and displaying to the second person the group of potential matching faces. In one variation, the method receives input selecting one face from the group of potential matching faces and displays additional information about the selected one face. In a related variation, the method displays additional information about one or more face in the displayed group of potential matching faces without receiving input.

17 Claims, 6 Drawing Sheets

SYSTEM AND METHOD FOR MATCHING FACES

BACKGROUND OF THE INVENTION

1. Field of the Invention

The present invention relates to image recognition and more specifically to matching pictures of faces in a contacts list.

2. Introduction

Any given person in modern society can be acquaintances with hundreds or even thousands of other people. While many acquaintances are memorable, the sheer number of familiar faces defies memorization of every name of every acquaintance. Many times, people see someone else and recognize them as a familiar face but cannot recall the context of the familiarity or the person's name. Sometimes people feel socially awkward when they must ask the familiar person's name is or how they know each other. On a related note, a person can instantly recognize each familiar face in a group picture or a series of pictures, such as a group picture or a family photo album. However, this information is difficult and time consuming to convert to a usable form. A user must manually identify each person in a photograph and enter data for each. This problem is further compounded by fading memories. Especially with old pictures, the face may be familiar without any recollection of a name. Because of the barriers of the time, effort, and fading memory, very few people archive this valuable source of historical information. These needs and problems are combined with pervasively available portable devices with cameras, such as Personal Digital Assistants (PDAs), smartphones, and regular cell phones. Accordingly, what is needed in the art is an improved way to recognize familiar faces.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for matching faces. The method includes receiving an image of a face of a first person from a device of a second person, comparing the image of the face of the first person to a database of known faces in a contacts list of the second person, identifying a group of potential matching faces from the database of known faces, and displaying to the second person the group of potential matching faces. In one variation, the method receives input selecting one face from the group of potential matching faces and displays additional information about the selected one face. In a related variation, the method displays additional information about one or more face in the displayed group of potential matching faces without receiving input. The method can further add the received image of the face of the first person to the database of known faces with a link to the selected one face. To aid in face comparison, the method can alter the received image.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
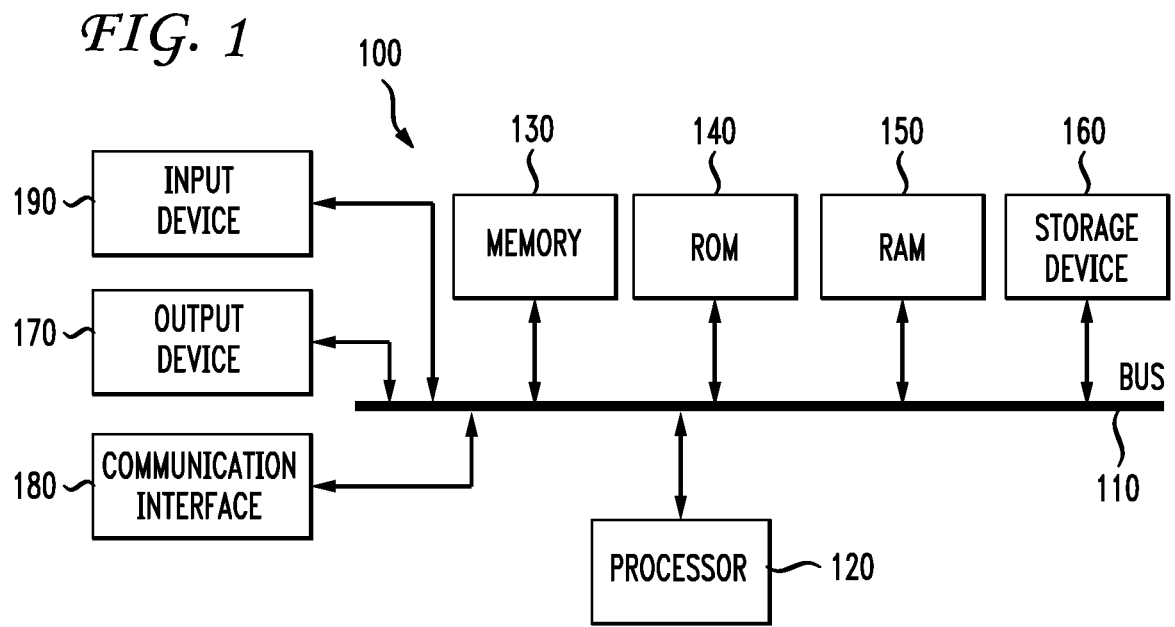
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive

160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
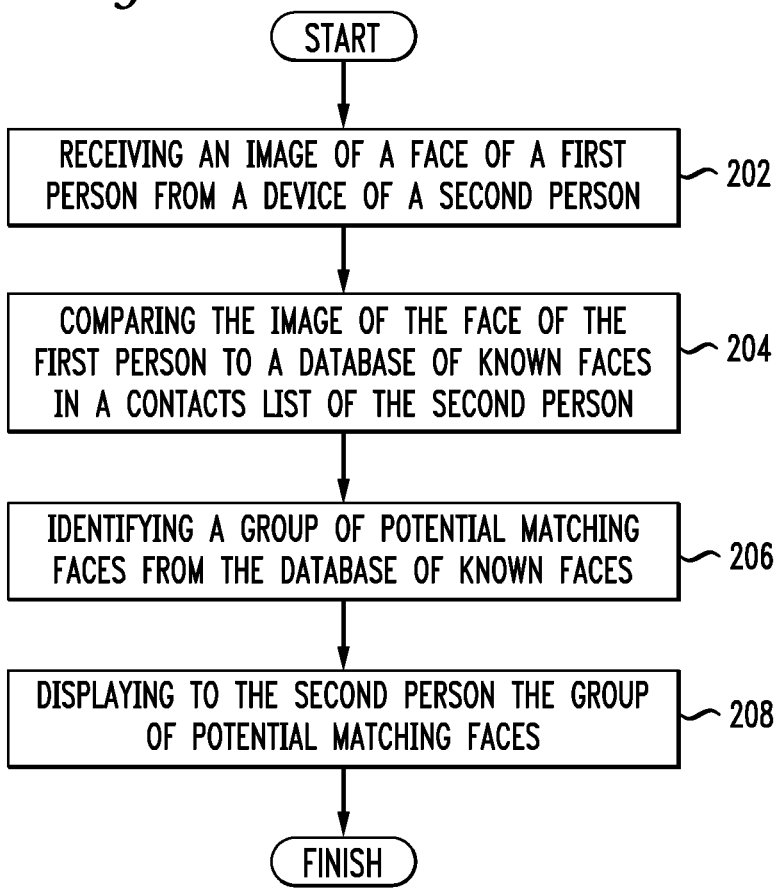
FIG. 2 illustrates an example method embodiment for recognizing familiar faces.

Having disclosed some fundamental system components, the disclosure turns to the example method embodiment for recognizing familiar faces as shown in FIG. 2. For clarity, the method in FIG. 2 is discussed in terms of systems configured to practice the method. The system receives an image of a face of a first person from a device of a second person (202). One potentially common situation is where the second person sees the first person, recognizes the first person's face, but cannot recall the first person's name or how he knows the first person. The second person can take a photograph of the first person using, for example, a standalone camera or a camera integrated into a smartphone. The system can be a located in a remote server or cloud of servers or the system can be entirely self-contained in the camera or the smartphone. While the disclosure discusses the system in terms of this common situation, the system can also apply to other situations.

The system compares the image of the face of the first person to a database of known faces in a contacts list of the second person (204). A contacts list can be part of a smartphone or PDA or part of a personal organizing application such as Microsoft Outlook. Contacts lists often include photographs of the contacts. In some situations, contacts include choose their own photograph to include in the contacts list, like a public profile picture on Facebook.com. In other situations, the person who maintains the contacts list can take photographs of the people in the contacts list. In one embodiment, the smartphone interfaces with a contacts list stored in a network.

The system identifies a group of potential matching faces from the database of known faces (206). Because the list of known faces is typically very limited, the system can perform this comparison with relatively modest computing power. The system can identify matching faces using the same mobile device that took the picture or the system can offload that processing to a remote server. After the system identifies the group of potential matches, it displays to the second person the group of potential matching faces (208). The system can display the group on one screen simultaneously, in a list of reduced-size icons, in a menu system, one at a time, or nearly any other arrangement. In one aspect, the system further receives input selecting one face from the group of potential matching faces and displays additional information, such as name or contact information, about the selected one face. For example, with a touch-sensitive screen the user can tap on the desired face and the system can display the associated name, job title, address, notes, and/or any other available information. In a related variation, the system displays additional information about one or more face in the displayed group of potential matching faces independent of receiving user input. The system can, for example, display a list of faces with the respective first names shown beneath each. The system can provide more information to the user on demand.

In another aspect, the system further adds the received image of the face of the first person to the database of known faces with a link to the selected one face. In this way the system can add more faces to the database of known faces. The system can then use more data points to match faces. Different pictures reflect the same face in different lighting, hair styles, angles, and so on. The system can retain a collection of images for one face. When the system finds a match of a face that has a collection of images, the system can provide an indication of which image in the collection was the closest match.

In one embodiment, the system receives from the user a subcategory in the database of known faces and removes faces which are not part of the subcategory from the group of potential matching faces. Often people can recognize a face, not remember a name, but know enough about the face to rule out certain categories of contacts. For example, Larry sees a person that looks familiar, but can't remember the person's name. Larry is certain that the person is not from the office and not in his family, so Larry indicates to the system to search for the person's face in his contacts list, but to exclude contacts labeled family or office. When the system processes the picture of the person that Larry took, the system skips over contacts under family or office. This approach can reduce the amount of processing power necessary to perform the comparison quickly.

The system can also alter the received image to aid in comparing the image to the database of known faces. For example, the system can center, brighten, crop, stretch, skew, change the color balance, zoom, or otherwise alter the image to enhance face comparison.

In one aspect, a user can indicate a desire for a quick match or a more rigorous match. Often a very brief search of the contacts list will retrieve the correct face, but sometimes the user needs a more thorough search, such as when multiple contacts look alike. The system can base the face match on a threshold of time or accuracy. The system uses different algorithms or variables when matching faces to meet the user's indicated desire for speed or accuracy.

Figure 3:
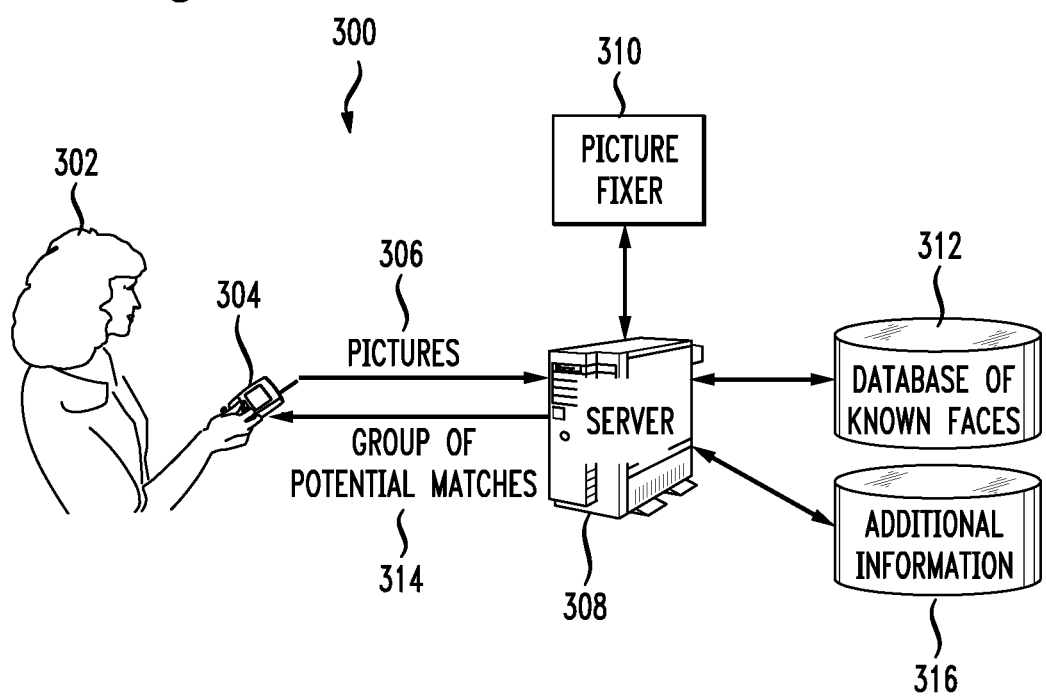
FIG. 3 illustrates an example system for recognizing familiar faces.

FIG. 3 illustrates an example system for recognizing familiar faces. As discussed before, if a user 302 sees a person he or she recognizes but cannot recall their name, the user 302 can take a picture, possibly surreptitiously, of the familiar face with a portable camera 304. The portable camera can be integrated as part of a smartphone or PDA with photographic contact information. The smartphone 304 sends the picture 306 to a server 308 for processing. The server 308 can be external to the smartphone or the server can be integrated as part of the smartphone. The server 308 an pass the received picture 306 to a fixing unit 310 to optimize the picture for matching to other faces. Some possible operations for a picture fixer 310 include rotate, deskew, remove borders, remove noise, despeckle, sharpen, resize, crop, lighten, and remove redeye. The system can use other now known or yet to be developed picture fixing techniques. After the picture is fixed, the system compares the picture 306 to a database of known faces 312, such as a PDA or smartphone address book, corporate photo directory, yearbook, neighborhood photo directory, and even an online list of contacts such as those on Facebook.com or Myspace.com. The server identifies a group of faces that are potential matches 314 to the received picture and displays those faces on the device with the portable camera 304, or another device. The server can retrieve additional information 316 about each face in the group of potential matches 314 and display that information as well. In some cases, the system only displays the additional information after the user requests the additional information by a tap, click, key press, or other user input. The user can then see the matching faces and additional information to jog his or her memory and positively identify the familiar face.

The system can select the group of potential matches as an N-best list, representing those matches with the highest confidence scores. The system can constrain the size of the group based on the display device's capabilities. The system can select all matches over a confidence threshold, such as every match having a confidence score over 75%. The system can select a certain number of top matches regardless of confidence scores, such as the top 4 matches.

In one aspect, the system displays the group of potential matching faces simultaneously on a display device. In another aspect, the system displays the group of potential matching faces in a slide show or an interactive, browseable album. In either aspect, the system can display additional information next to each face. The system can accept user input in the form of a button press, speech command, or even a shake of the device (with accelerometer enabled devices) to signal to the system that none of the faces are a match. In that case, the system can search for, retrieve, and display more faces for the user.

Figure 4:
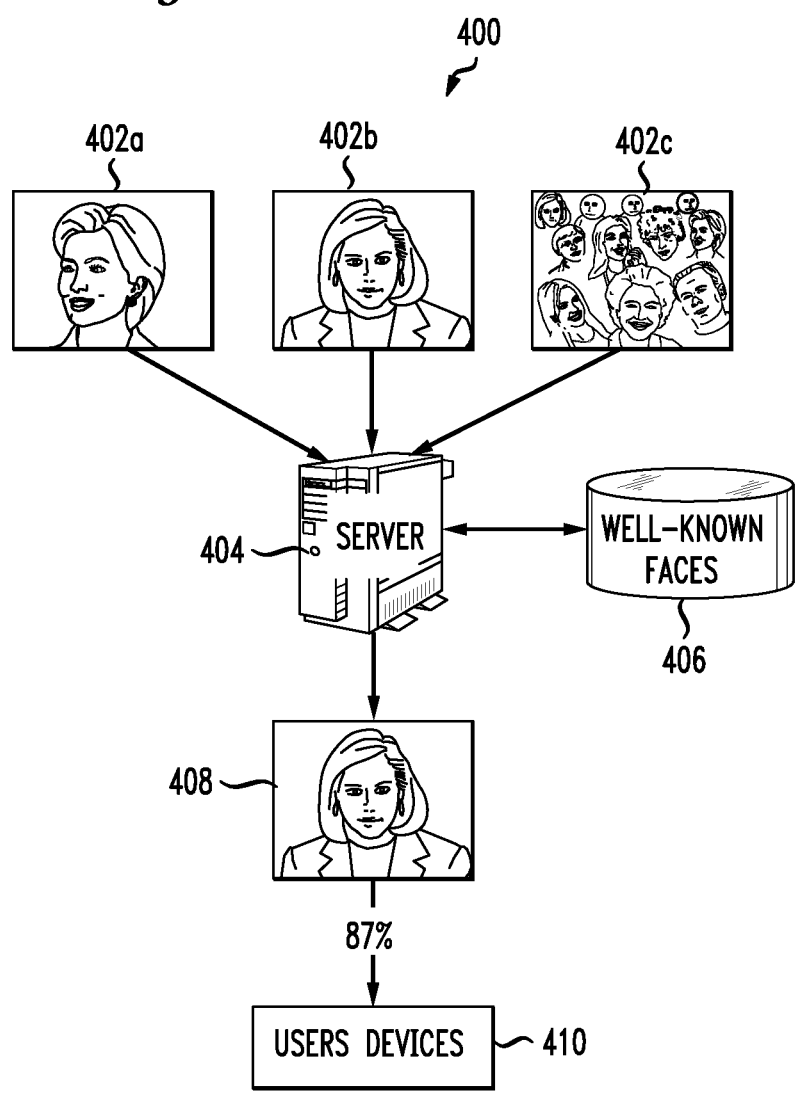
FIG. 4 illustrates an example system for recognizing celebrity faces.

FIG. 4 illustrates an example system for recognizing celebrity faces. In one aspect, celebrities attend large events such as professional basketball games. One example is Jack Nicholson frequently attending Los Angeles Lakers games. When people see someone that looks like Jack Nicholson far away in the crowd, they may be unsure if it is really Jack Nicholson or not. The system can exploit the well-photographed celebrity and the fact that many other surrounding spectators are probably also asking themselves if it is really Jack Nicholson or not. Various users take photographs of the person in question from different angles and distances 402a, 402b, 402c using their smartphones, cellphones, PDAs, laptop, regular camera, or other device. The users send these pictures to a server 404 which compares the different angles to a database of well-known faces 406. Such a database of well known or celebrity faces can be found on imdb.com (Internet Movie Database) or laughingstar.com. The system determines a percentage match for the celebrity 408, in this case the system is 87% sure it is a match. The system transmits the best photograph of the celebrity and the match certainty to users' devices 410. The same principles can be applied not only to collaboratively generated individual photos of a large group, but also to large, high resolution photographs, such as those taken by the Gigapxl project (see www.gigapxl.org).

Figure 5:
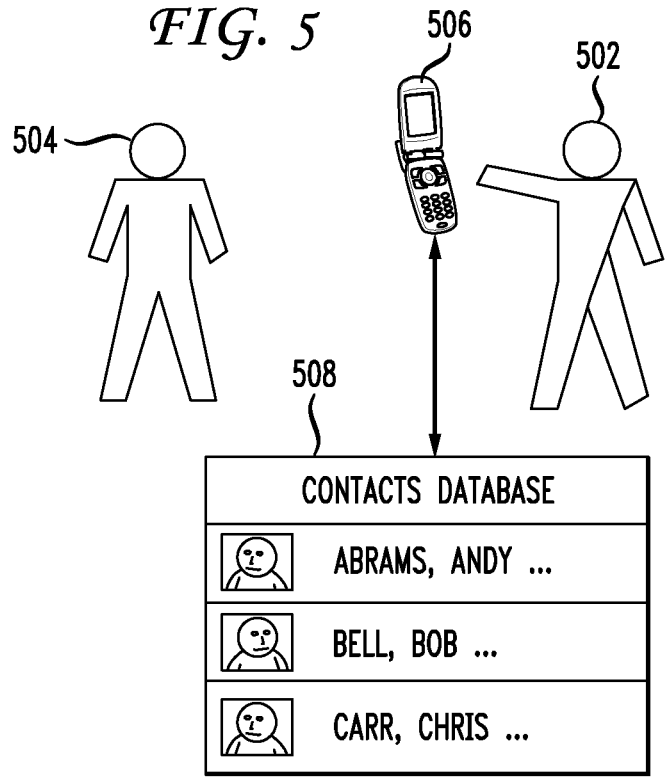
FIG. 5 illustrates a person taking a picture of a familiar face.

FIG. 5 illustrates a person taking a picture of a familiar face. A person 502 sees a familiar face 504 across the room, but cannot remember the name of the person with the familiar face 504. The person 502 can surreptitiously take a picture of the familiar face 504 with his smartphone camera 506. The smartphone compares the photo with photographs in the smartphone contacts. A smartphone can also access a limited number of online photographs for comparison. Some example sources of online photographs which may be relevant are myspace.com and facebook.com. The smartphone can compare these online photos to find potential matches too. When the smartphone has assembled a group of likely matches, it displays them to the user. One example of such an interface to display likely matches to the user is shown in FIG. 6.

Figure 6:
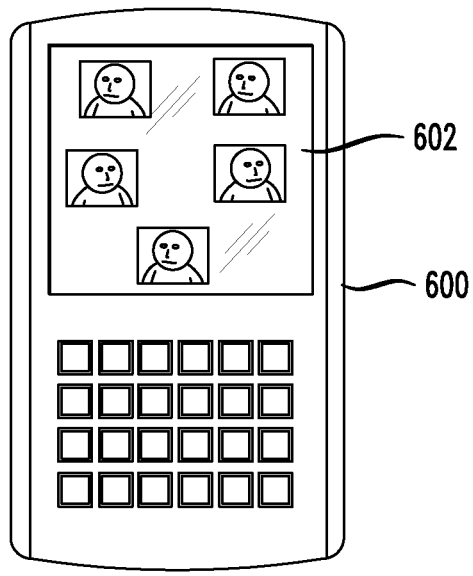
FIG. 6 illustrates an example interface presenting a group of potential matching faces.

FIG. 6 illustrates an example interface presenting a group of potential matching faces. The smartphone 600 or other portable device shows a small grouping of photographs 602 to the user. The interface can show faces alone or faces associated with names, contact category (business, family, friends, college, etc.), or other contact information. The interface can also show the source of the photographs. When the user taps, clicks, or otherwise selects one of the matching faces, the device 600 can display the associated name as well as more detailed information about the selected face.

Figure 7:
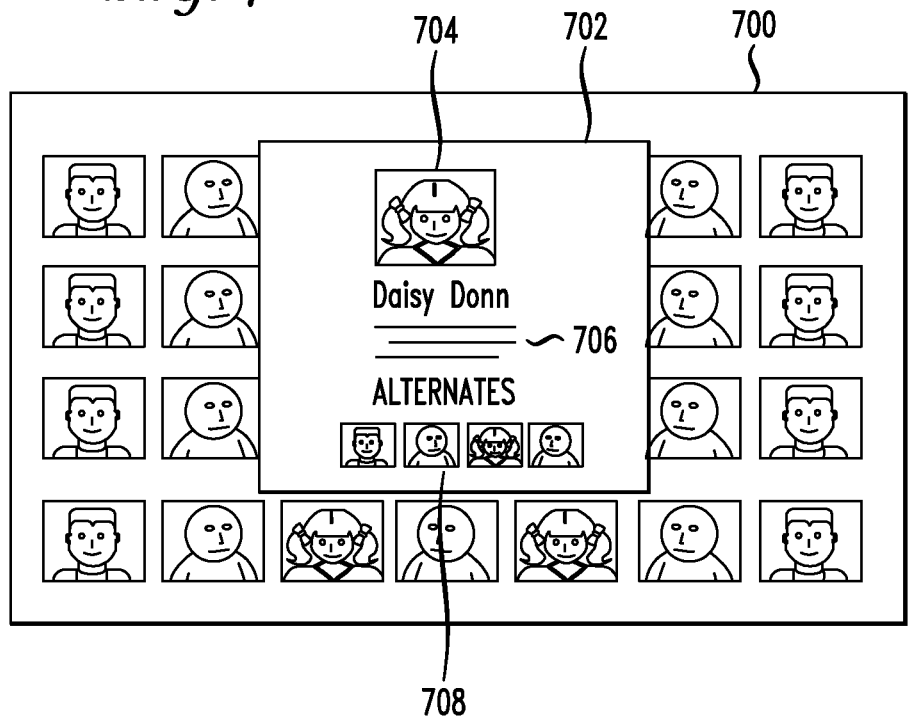
FIG. 7 illustrates an example face recognition in a photo directory.

The same recognition principles can apply to pictures having multiple faces as well. FIG. 7 illustrates an example face recognition in a photo directory context. The photo directory 700 is a collection of many separate portraits. A user can select a single portrait 704 of a familiar face to show more information about a matching contact. For example, if the photo directory is online, a personal computer can search an online or offline email address book and corresponding photographs to find a match. Once the search finishes, the system displays the contact information 706 over the photo directory. If the match is a weak match or if other strong matches exist, the system can also display a list of alternate matches 708. If the main match 704 is incorrect, the user can select one of the alternate matches instead.

Figure 8:
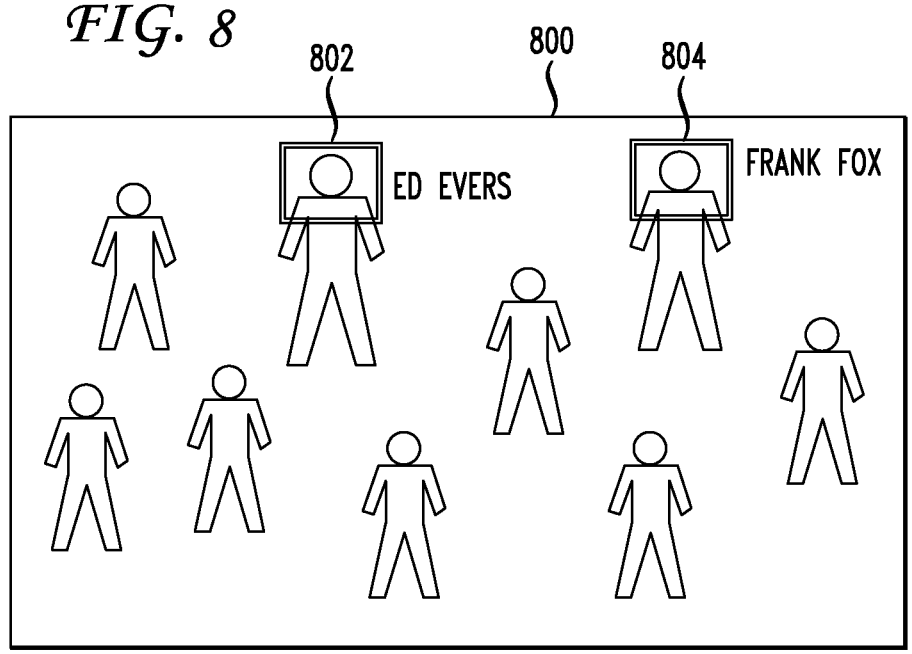
FIG. 8 illustrates an example face recognition in a group photograph.

FIG. 8 illustrates an example of face recognition in a group photograph. The system can identify and recognize all or some individual faces in a group photo 800. For example, a user can instruct the system to search for matches to all the faces or for a particular face. The system marks identified faces with contact information 802, 804. As faces are recognized in a group photograph that is part of a series of photographs, positive face identifications can add to a face database for each person. Such a database can provide different angles, expressions, ages, lighting, and other variations on the same face, allowing the system to improve and better recognize later instances of the face. One example application of this system is a family photo album. The family first provides some basic information including a photograph for each family member. Then the system can process each photo and build a face recognition database tuned to the family members that grows and adapts as it processes more photos. In this way, the system can automatically annotate family photo albums. One benefit of this approach is that the system can identify those photographs in which it cannot recognize familiar faces. Human time and effort for face recognition is conserved for those photographs which are problematic for automatic recognition. The system can incorporate positive and negative feedback from users to improve and/or tweak the face recognition and matching algorithms.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any situation in which a user wishes to recognize a familiar face from a small group of faces and recall additional information about the familiar face. For example, police stations or surveillance systems can use these principles to identify repeat offenders caught on tape. Those skilled in the art will readily recognize various modifications and changes that may be made to the present invention without following the example embodiments and applications illustrated and described herein, and without departing from the true spirit and scope of the present invention.

I claim:

1. A method comprising:
receiving an image of a face of a first person from a device of a second person;
comparing the image to a database of known faces in a contacts list of the second person;
identifying a group of potential matching faces from the database of known faces;
displaying, on the device of the second person, images of the group of potential matching faces, wherein the images are associated with the contacts list;
receiving from the second person a subcategory in the database of known faces; and
removing faces which are not part of the subcategory from the group of potential matching faces.

2. The method of claim 1, the method further comprising:
receiving input selecting one face from the group of potential matching faces; and
displaying additional information about the one face.

3. The method of claim 2, the method further comprising adding the image of the face of the first person to the database of known faces with a link to the one face.

4. The method of claim 2, wherein the additional information comprises contact information.

5. The method of claim 1, the method further comprising displaying additional information about at least one a face in the group of potential matching faces.

6. The method of claim 1, the method further comprising altering the image to aid in comparing the image to the database of known faces.

7. A system comprising:
a processor; and
a computer-readable storage medium having instructions stored which, when executed by the processor, perform operations comprising:
receiving an image of a face of a first person from a device of a second person;

comparing the image to a database of known faces in a contacts list of the second person;

identifying a group of potential matching faces from the database of known faces;

displaying, on the device of the second person, images of the group of potential matching faces, wherein the images are associated with the contacts list;

receiving from the second person a subcategory in the database of known faces; and removing faces which are not part of the subcategory from the group of potential matching faces.

8. The system of claim 7, the computer-readable storage medium having additional instructions stored which result in the operations further comprising:

receiving input selecting one face from the group of potential matching faces; and displaying additional information about the one face.

9. The system of claim 8, the computer-readable storage medium having additional instructions stored which result in the operations further comprising adding the image of the face of the first person to the database of known faces with a link to the one face.

10. The system of claim 8, wherein additional information comprises contact information.

11. The system of claim 7, the computer-readable storage medium having additional instructions stored which result in the operations further comprising displaying additional information about a face in the group of potential matching faces.

12. The system of claim 7, the computer-readable storage medium having additional instructions stored which result in the operations further comprising altering the image to aid in comparing the image to the database of known faces.

13. A computer-readable device having instructions stored, which, when executed by a computing device, perform operations comprising:

receiving an image of a face of a first person from a device of a second person;

comparing the image to a database of known faces in a contacts list of the second person;

identifying a group of potential matching faces from the database of known faces;

displaying, on the device of the second person, images of the group of potential matching faces, wherein the images are associated with the contacts list;

receiving from the second person a subcategory in the database of known faces; and removing faces which are not part of the subcategory from the group of potential matching faces.

14. The computer-readable device of claim 13 having additional instructions stored which result in the operations further comprising:

receiving input selecting one face from the group of potential matching faces; and displaying additional information about the one face.

15. The computer-readable device of claim 14 having additional instructions stored which result in the operations further comprising adding the image of the face of the first person to the database of known faces with a link to the one face.

16. The computer-readable device of claim 14, wherein additional information comprises contact information.

17. The computer-readable device of claim 13 having additional instructions stored which result in the operations further comprising displaying additional information about a face in the group of potential matching faces.

* * * * *